July 29, 1941.        J. T. COOPER        2,250,748
SEAL
Filed Oct. 7, 1940
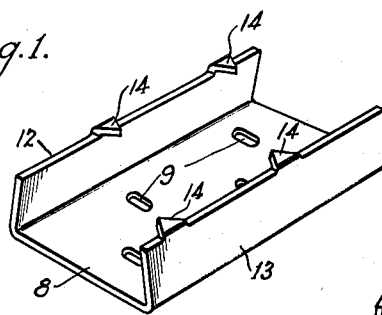
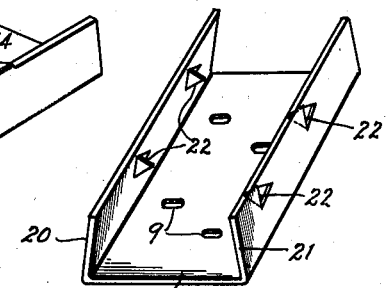
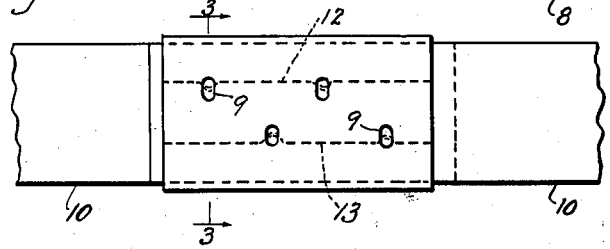
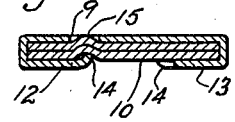
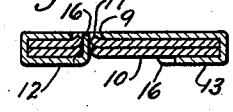
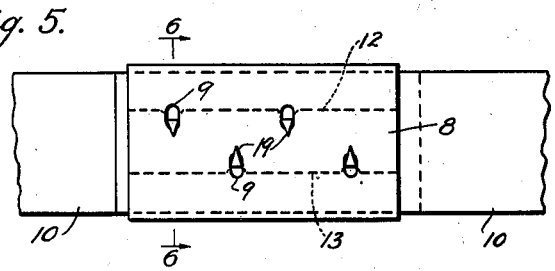
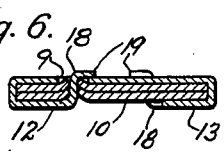
INVENTOR.
Joseph T. Cooper
BY Carlos G. Stratton
ATTORNEY Patented July 29, 1941

2,250,748

UNITED STATES PATENT OFFICE 2,250,748

SEAL

Joseph T. Cooper, Los Angeles, Calif.

Application October 7, 1940, Serial No. 360,145

3 Claims. (Cl. 24—23)

My invention relates to a seal and more particularly to means for sealing together two pieces of metal or other material, or sealing a piece of material to itself, such as a band and the like.

An important object of the invention is to provide such a seal that can be locked in position by a hammer or pliers as well as by a more complicated sealing machine.

Another object of the invention is to provide points or other projections for engaging the band or other material, to lock same in place.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Figure 1 is a perspective view of an embodiment of my invention, prior to being applied to any material to be sealed.

Figure 2 is a rear face view of my seal applied to a band.

Figure 3 is a section taken on the line 3—3 of Figure 2.

Figure 4 is a similar cross-section of a modified construction of my seal.

Figure 5 is a view similar to Figure 2, but showing a still further modified construction of my invention.

Figure 6 is a section taken on the line 6—6 of Figure 5.

Figure 7 is a perspective view of another modified construction of my invention.

Referring more in detail to the drawing, the reference numeral 8 generally designates a body member in all of the embodiments shown. The body member 8 has elongated slots 9, the length of which extend transversely to the length of the body member 8 and transversely to the length of a band 10 sealed by the device.

The body member 8 has flanges 12 and 13 extending laterally from the edges thereof. In the form shown in Figures 1 to 3, the flanges 12 and 13 have relatively short points 14 which emboss the overlapping ends of the band 10, as best shown at 15 in Figure 3. It is to be understood that the points 14 are disposed opposite the elongated openings 9 when the flanges 12 and 13 are clamped down upon ends of a band gripped by the sealing device, thus the points 14 tend to force material of the band 10 into the openings 9, thus embossing same, as shown at 15.

In the form shown in Figure 4, longer points 16 are used, in order that such points may pierce the band ends 10, as shown at 17. This piercing of the band ends is a further means for holding the band in its sealed position.

In the form shown in Figures 5 and 6, the points 18 are still longer and after they have pierced the band ends 10, the points 18 are bent down upon the rear face of the body 8, as shown at 19, thus clinching the points in position. This, of course, is another means by which the seal may clamp the band ends in relatively fixed positions.

In the still further modified construction shown in Figure 7, flanges 20 and 21 are made wider than the flanges 12 and 13. Angular points 22 are punched inward from the flanges 20 and 21. These inwardly punched angular points 22 are disposed opposite the openings 9 when the flanges 20 and 21 are bent down with respect to the body portion 8. In other words, the bases of the angular points 22 are substantially opposite the openings 9, so that when the points 22 are bent inwardly substantially at right angles to the flanges 20, 21, the points will project substantially toward the openings 9.

It is believed that the operation and use of the present sealing device is apparent from the foregoing description, since all that is necessary is to place the ends of a band, or other material desired to be sealed, on the inner face of the body portion 8 and then bend the flanges inward until the points thereon either emboss or pierce the band or other material. If the points are long enough they may be clinched down on the back of the body member 8.

It is believed clear without further illustration that the points 22 on the form shown in Figure 7 may be similarily used to emboss or pierce the band or other material. Of course if the points 22 are used to pierce the material, these points must be made slightly longer. Moreover, by making the points 22 stilll longer, they may be clinched down on the back of the body member 8.

It will be noted that the arrangement on the length of the openings 9 transverse to the length of the band 10, makes a line of resistance against escape of one of the ends of the band 10, whereas a circular opening would reduce the transverse portion to a point. The present construction has a greater resistance to the release of either end of the band 10.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. A sealing device comprising a body portion, to receive thereon material to be sealed, lateral flange means arranged on the body portion and bendable toward the body portion and to clasp material on the body portion, the body portion having at least one opening elongated in a direction transversely to the length of the body portion and of substantial width, and at least one projection on the flange means arranged opposite the elongated opening means when the flanges are bent toward the body portion and of a length less than the distance between the bent flange and the body and effective to upset portions of the clasped material into the opening of the body portion.

2. A sealing device comprising a body portion to receive thereon material to be sealed, lateral flange means arranged on the body portion and bendable toward the body portion and to clasp material on the body portion, the body portion having at least one opening, and at least one projection on the flange means projecting from the outer edge of a flange means, the projection means being disposed to project inwardly in line with the opening toward the body portion and being of a length less than the distance between the bent flange and the body portion for upsetting portions of the clasped material into the body opening, and the body opening being of substantial width and length for receiving substantial portions of the upset material, and elongated in a direction transversely of the body portion and flange.

3. A sealing device comprising a body portion, lateral flange members at opposite sides arranged on the body portion and bendable toward the body portion and to clasp material on the body, the body portion having staggered openings of substantial width and length elongated in a direction transversely of the body portion, flanges for receiving therein substantial upset portions of material clasped between the body portion and flanges, and projections disposed in a staggered arrangement on the flanges and disposed inwardly with relation to the body portion and to project a portion of the distance from the flanges to the body opposite the openings, whereby to upset portions of the clasped material into the body openings when the flanges are bent toward the body portion.

JOSEPH T. COOPER.